Figure 1:
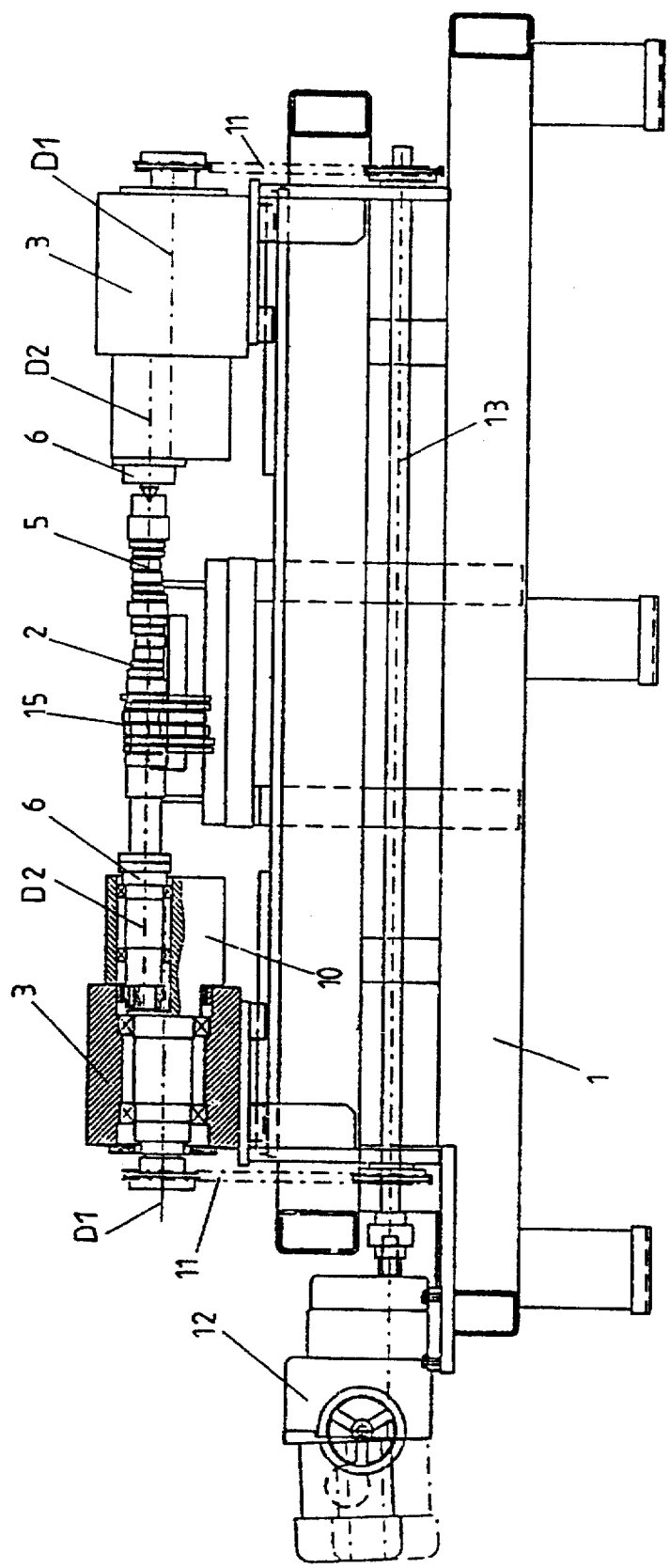

United States Patent [19]
Ottenwaelder et al.

[11] Patent Number: 5,796,078
[45] Date of Patent: Aug. 18, 1998

[54] METHOD FOR THE INDUCTIVE SURFACE HARDENING OF WORKPIECES

[75] Inventors: Adalbert Ottenwaelder, Stimpfach; Manfred Machnig, Aalen; Dieter Kullick, Trochtelfingen; Rudolf Fuchs, Aalen, all of Germany

[73] Assignee: Maschinenfabrik Alfing Kessler GmbH, Aalen-Wasseralfingen, Germany

[21] Appl. No.: 808,202

[22] Filed: Feb. 28, 1997

[30] Foreign Application Priority Data

Mar. 16, 1996 [DE] Germany ............ 196 10 416.5

[51] Int. Cl.$^6$ .................. H05B 6/40; H05B 6/10
[52] U.S. Cl. .......... 219/639; 219/652; 148/572; 266/129
[58] Field of Search ............ 219/639, 652; 148/572, 573; 266/129

[56] References Cited

U.S. PATENT DOCUMENTS

| | | | |
|---|---|---|---|
| 2,368,809 | 2/1945 | Denneen et al. | 219/652 |
| 2,665,367 | 1/1954 | Seulen | 219/639 |
| 3,777,097 | 12/1973 | Budzinski | 219/640 |
| 4,184,798 | 1/1980 | Laughlin | 219/652 |
| 4,759,808 | 7/1988 | Norvorsky | 148/572 |

*Primary Examiner*—Phillip H. Leung
*Attorney, Agent, or Firm*—Welsh & Katz, Ltd.

[57] ABSTRACT

In a method for the inductive surface hardening of workpieces with any desired external geometries, especially camshafts for internal combustion engines, an inductor (15) is provided which at least partially surrounds the workpiece (2 or 4). The workpiece (2 or 4) executes a uniform rolling motion, and, given a constant coupling distance (X), the internal contour (18) of the inductor (15) represents a line parallel to the rolling contour (16) of the workpiece (2 or 4).

4 Claims, 3 Drawing Sheets

METHOD FOR THE INDUCTIVE SURFACE HARDENING OF WORKPIECES

The invention relates to a method for the inductive surface hardening of workpieces with any desired external geometries, especially camshafts of internal combustion engines, having an inductor which at least partially surrounds the workpiece. The invention furthermore relates to an apparatus for carrying out the method.

In the inductive hardening of external geometries which deviate from the circular, especially irregularly shaped geometries, as is the case, for example, with camshafts, considerable problems arise in achieving uniform hardness penetration depths over the circumference. A precondition for a uniform hardness penetration depth is, namely, the maintenance of a constant heating zone, i.e. a constant or preselected distance between the inductor and the external geometry of the workpiece to be hardened. If the workpiece is rotated about its longitudinal axis during the hardening process, different coupling distances and hence different hardness penetration depths are obtained if the external geometry deviates from the circular.

Another possibility for surface hardening is for the workpiece to be heated while stationary, the inductor being placed with a corresponding negative shape over the workpiece. In this case, both parts, namely the workpiece and the inductor, are fixed. However, even in the case in which the inductor has the negative shape of the external geometry of the workpiece, the heat patterns obtained are not the same at all points owing to physical conditions, and hence, in turn, differing hardening zones are obtained.

The object on which the invention is based is therefore to create a method and an apparatus for inductive surface hardening, it being possible to harden any desired external geometry in such a way that it is possible to maintain identical or preselected coupling distances at all times and hence also, when required, to achieve uniform or selective hardness penetration depths.

According to the invention, this object is achieved by virtue of the fact that the workpiece executes a uniform rolling motion, and, given a constant coupling distance, the internal contour of the inductor represents a line parallel to the rolling contour of the workpiece.

The method according to the invention results in a constant or in part precisely defined coupling distance and hence uniform heating zones, a homogeneous transformation structure during hardening and hence a constant hardness penetration depth thereby being achieved. The constant heating zone furthermore has the advantage that thermal distortion of the workpiece to be hardened is kept to a minimum.

In practice, the inductor represents a line parallel to the rolling curve of the external contour of the workpiece or is equidistant to the workpiece contour if a constant coupling distance is desired. If different hardness penetration depths are desired over the circumference or the mass ratios of the workpiece require it for a uniform hardness penetration depth, it is also possible for the coupling distance to be changed in part.

As a further development of the invention, it is envisaged that the workpiece should revolve about a central axis D1 in the interior of the inductor and, in addition, should rotate upon itself about an axis D2 at an integral ratio during one revolution.

The rotary motions according to the invention about the axes of rotation D1 and D2 provide a simple means of ensuring a uniform rolling motion of the workpiece in the inductor. Each position on the surface has a fixed relationship to a defined position on the inductor. This ensures that the hardness penetration depth can be controlled individually at any point on the surface of the workpiece. The method according to the invention ensures that the perpendicular distance between the tangent at the intersection of the extended lines through the axes of rotation D1 and D2 with the external contour of the workpiece and the internal contour of the inductor, i.e. the coupling distance, can be held constant.

In a very advantageous development of the invention, provision can be made for the coupling distance to be adjusted by changing the distance between the two axes.

By means of this measure, it is possible to select or preselect specifically preselected hardness penetration depths and to maintain these.

In a development of the invention, this method also has the advantage that, given changes in the power of the inductor or different amounts of power fed in at selected areas of the circumference, the hardness penetration depth can be separately influenced at desired radial positions. In relation to the hardening of a camshaft, this means that it is possible, by appropriate control of the power of the inductor in the region of the cam, to achieve a greater hardness penetration depth in the region of the cams, for example, than on the base circle of the camshaft. All that is required for this is that the power of the inductor be controlled in an appropriate manner in the region of the rolling curve in which this geometrical-relationship pertains.

An apparatus according to the invention for carrying out the method, with a workpiece held in a gripping device and with an inductor, can consist in that the workpiece is held in at least one workpiece-holding member that can be rotated about an axis of rotation, the workpiece-holding member itself being rotatable about a central axis of rotation and the speeds of rotation of the rotating parts being in a fixed integral ration to one another and the internal contour of the inductor corresponding to the rolling curve of the workpiece.

In a structurally simple configuration, the two rotary motions according to the invention about the axes of rotation D1 and D2 can be realized by means of a planetary gear mechanism.

If there is a plurality of hardening zones lying one behind the other in the axial direction on a workpiece, then, in a development of the invention, provision is made for a plurality of inductors, which, on the inside, have the rolling shape of the workpiece, to be arranged next to one another along the longitudinal axis of the workpiece to be hardened. In this way, it is possible, when required, to harden the workpiece in a single operation.

The inductor can comprise a plurality of turns. This has the advantage of better efficiency. In this way, it is thus possible, for example, to adjust the width of action.

Figure 2:
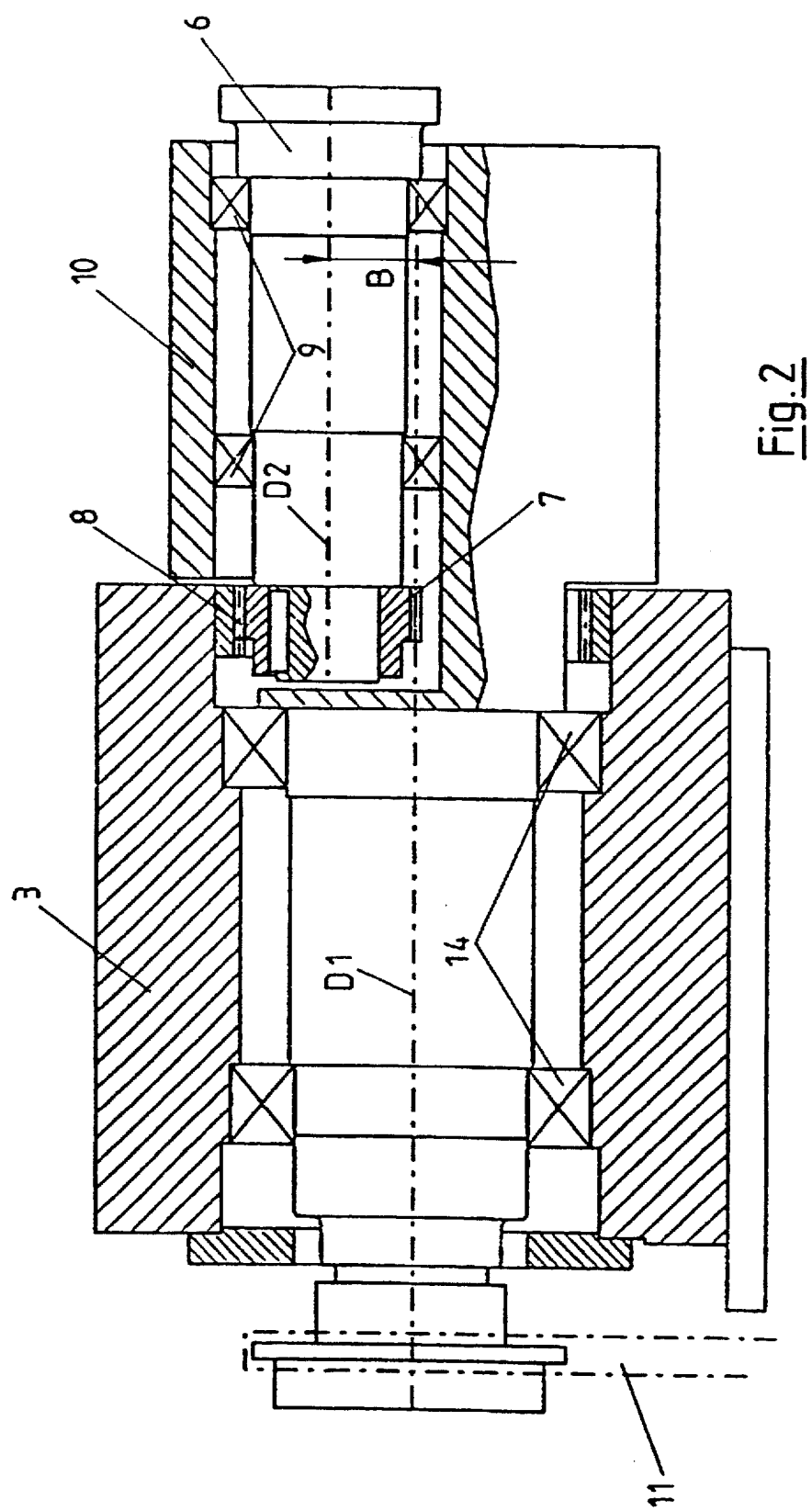
Figure 3:
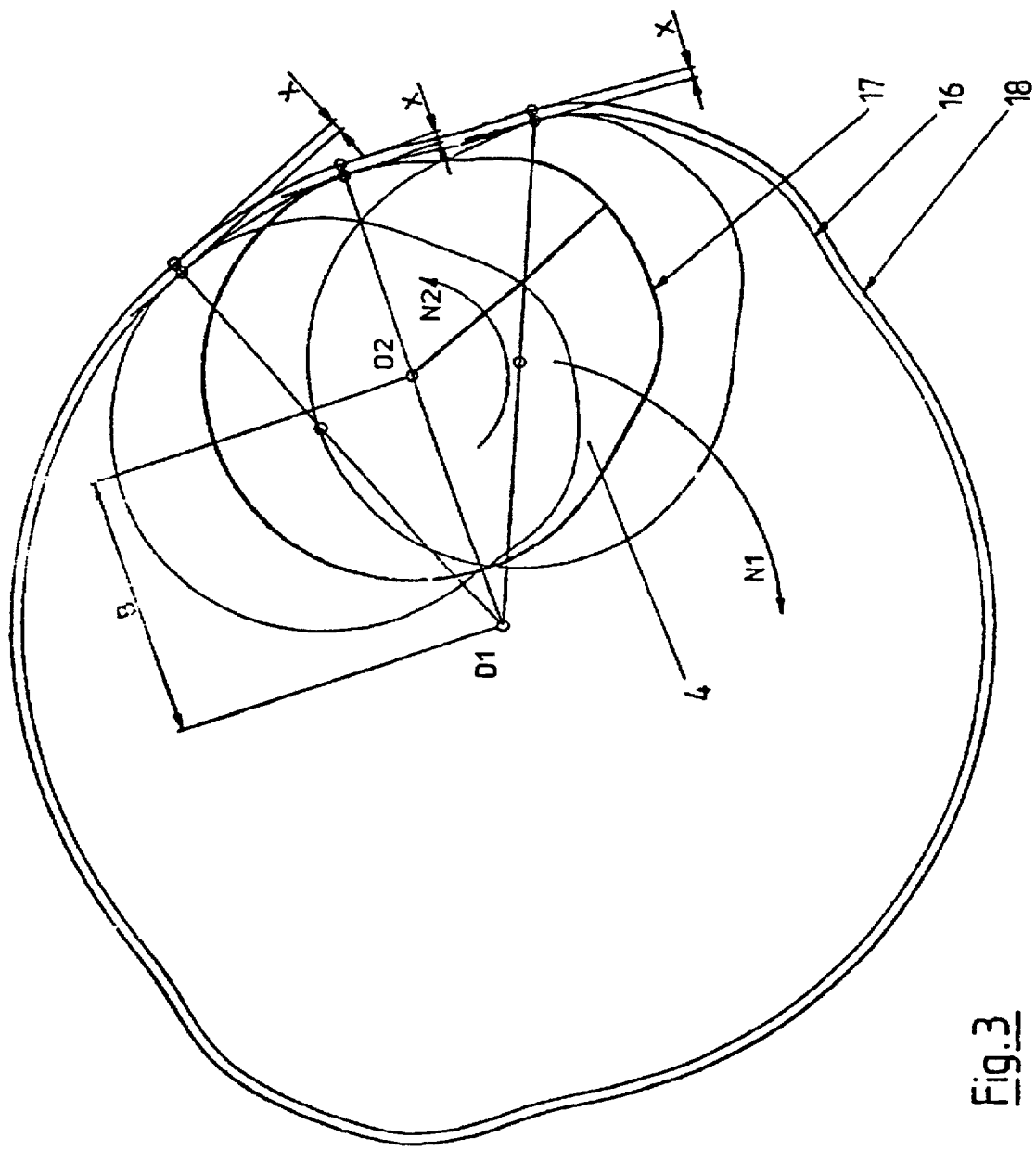

An exemplary embodiment of the invention is described in greater detail in principle below, with reference to the drawing, in which:

FIG. 1 shows an overall view of an apparatus according to the invention for the inductive hardening of a camshaft, FIG. 2 shows an enlarged representation of the gripping device with the two axes of rotation, FIG. 3 shows a schematic representation of the contour of the camshaft and its rolling contour together with the contour of the inductor.

A camshaft 2 is held at both ends in a gripping device 3 on a machine tool 1. In a known manner the camshaft 2 has circular sections which are arranged coaxially with respect to its longitudinal axis 5 and cams 4 which deviate from the circular. The camshaft 2 is held in the two gripping devices 3 in such a way that its longitudinal axis 5 is coaxial with respect to an axis of rotation D2. Rotating about the axis of rotation D2 is a workpiece-holding member 6, which is connected to the camshaft 2 at the end. Arranged at the rear end of the workpiece-gripping member 6 is a gear wheel 7 which is in mesh with an internal gear wheel 8. The workpiece-gripping member 6 itself is held by means of rolling-contact bearings 9 in a central block 10 which rotates about an axis of rotation D1. The central block 10 is driven in a manner not shown in greater detail by a motor 12 via a belt or chain drive 11. A shaft connection 13 ensures that the two gripping devices 3, which are of identical design, are driven at a synchronous rotational speed. The central block 10 is supported in the housing of the gripping device 3 by means of rolling-contact bearings 14.

An inductor 15, illustrated schematically in FIG. 1, surrounds those areas of the camshaft 2 to be hardened.

The gripping of the camshaft 2 and its rotation about the axes of rotation D1 and D2 and their position relative to one another give rise to a rolling contour of the camshaft 2.

FIG. 3 shows the corresponding geometrical relationship, which is illustrated using the example of a cam 4 on the camshaft 2. As can be seen, there is a distance B between the axis of rotation D1 and the axis of rotation D2. During the rotation of the camshaft 2, its external geometry moves along its rolling curve 16, which is determined by the dependence of the gripping device 3 on the gearing. 17 denotes the contour of the cam 4. As can be seen, three different positions of the cam 4 are drawn in FIG. 3 for explanatory purposes in order to illustrate the rolling motion. The rolling curve 16 which arises due to the dependence on the gearing ensures that the perpendicular distance between the tangent at the intersection of the extended line through the axes of rotation D1 and D2 with the contour of the camshaft or cam 4 and the appropriately preselected internal contour 18 of the inductor 15 remains constant. This is the coupling distance X. The internal contour 18 of the inductor 15 represents a line parallel to the rolling curve 16 of the cam 4, or the internal contour 18 is equidistant to the rolling curve 16.

This geometrically fixed relationship of the rotary motion of the camshaft 2 within the inductor 15 with a constant speed of rotation for the axis of rotation D2 and the resulting speed of rotation, having a corresponding dependence, of the axis of rotation D1 results in a uniform rolling motion of the camshaft 2 in the interior of the free space of the inductor. Each surface position bears a fixed relationship to a defined position on the inductor 15. In this way, it is also possible to ensure that the hardness penetration depth can be controlled individually at any desired point on the surface of the cam 4.

An individual control is possible, for example, if the power of the inductor 15 and hence the hardness penetration depth is modified in a desired area of the circumference. In this way, it is possible, for example, to achieve a greater hardness penetration depth of the cam 4 in the area of its lobe than on its base circle. The same result can also be achieved by a partial alteration of the coupling distance.

A change in the distance B between the two axes of rotation D1 and D2 thus also changes the coupling distance X, i.e. the distance between the rolling curve 16 and the internal contour 18 of the inductor 15, it being possible by means of this alteration to control the hardness penetration depth too.

It is, of course, also possible, within the scope of the invention, for a plurality of inductors 15 to be provided axially adjacent to one another at the camshaft 2 to be hardened, in the region of the locations which are to be hardened, if the desire is to avoid moving the inductor 15 axially in a corresponding manner each time a hardening operation has been carried out.

A change in the distance B can be achieved structurally in various ways. For this purpose, it is possible, for example, to provide an axial differential, a cardan joint, a universal joint or the like.

Instead of producing a rolling curve for the camshaft by means of the gearing illustrated with the axes of rotation D1 and D2, the rolling curve can also be achieved in some other way. Thus, for example, a spindle can be driven coaxially in a manner corresponding to the central block 10, or the gripping points of the camshaft 2 are adjusted numerically in the x and y planes as a function of the rotation by the spindle. This can be accomplished, for example, by means of a cross-slide. In the case of need, the internal gear 8 arranged in the housing can, for example, also be adjusted in the circumferential direction, e.g. by 120°, by means of an adjusting device in order to enable an angular offset of the cam assemblies on the camshaft to be compensated for. In this way, it is possible, for example, using one induction hardening device, to harden the cams of one cylinder and then, after offsetting the internal gear wheel by, for example, 120°, to harden the cams of the next cylinder. By rotating the internal gear wheel 8 it is in this way possible to allow for an offset in the ignition sequence.

Instead of a rolling curve 16 for the camshaft or the cams 4 of the camshaft in the form of a continuous curve, the rolling motion can also be made to follow a horizontal path along the contour of the camshaft 2. In this case, the camshaft 2 is rotated upon itself. In order to produce the horizontal rolling curve, the camshaft is in this case connected to a pinion which interacts in an appropriate manner with a rack. The rotary motion of the pinion in conjunction with the rack results in the advance of the camshaft 2 in the horizontal direction, specifically transversely to the longitudinal axis of the camshaft 2. This, in turn, results in a development of the camshaft 2 which lies opposite the internal contour of the inductor at a constant coupling distance.

The hardening of the camshaft 2 on the machine tool 1 can be performed, for example, with the motor 12 operating at a driving speed of 120 rpm, and thus, in the exemplary embodiment illustrated, the workpiece-holding member and hence the camshaft 2 revolve at 240 rpm. In this case, hardening can take place within 20 seconds, for example, heating of a respective camshaft area taking place at a predetermined coupling distance each revolution during the rotation of the camshaft 2. After 20 seconds have elapsed and thus the desired hardening temperature has been reached, the camshaft is quenched in a known manner. Of course, the speed of rotation depends on the application and can be varied accordingly. The same applies to the heating time.

We claim:

1. A method for the inductive surface hardening of a workpiece, including a camshaft of an internal combustion engine, said workpiece having an inductor with an internal contour positioned about the workpiece, said workpiece revolving about a central axis in the interior of the inductor, a coupling distance between said workpiece and said inductor, said method comprising maintaining said coupling distance constant while maintaining the internal contour of the inductor in a line parallel to the contour of the workpiece at the point of closest proximity of said inductor and said workpiece, and rotating said workpiece about an axis at an integral transmission ratio during one revolution.

2. The method as claimed in claim 1 including the step of adjusting the coupling distance to a second constant distance by changing the distance between the two axes.

3. The method as claimed in claim 1, including the step of altering the power of the inductor during the revolution of the workpiece.

4. The method as claimed in claim 1, including the step of adjusting the coupling distance to any desired constant position relative to the workpiece.

* * * * *